(12) United States Patent
Zabulon et al.

(10) Patent No.: US 12,221,081 B2
(45) Date of Patent: Feb. 11, 2025

(54) AIRCRAFT WHEEL AND BRAKE ASSEMBLY

(71) Applicant: SAFRAN LANDING SYSTEMS, Velizy-Villacoublay (FR)

(72) Inventors: Joël Zabulon, Moissy-Cramayel (FR); David Frank, Moissy-Cramayel (FR); Xavier Gallerand, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 291 days.

(21) Appl. No.: 16/899,920

(22) Filed: Jun. 12, 2020

(65) Prior Publication Data

US 2020/0391705 A1 Dec. 17, 2020

(30) Foreign Application Priority Data

Jun. 13, 2019 (FR) ..................................... 1906336

(51) Int. Cl.
*B60T 1/06* (2006.01)
*B64C 25/44* (2006.01)
(Continued)

(52) U.S. Cl.
CPC .............. *B60T 1/065* (2013.01); *B64C 25/44* (2013.01); *G01P 3/36* (2013.01); *G01P 3/46* (2013.01); *B60T 2240/00* (2013.01)

(58) Field of Classification Search
CPC ........ B60T 17/22; B60T 13/741; B60T 1/065; B60T 8/171; B60T 8/329; B60T 8/1703;
(Continued)

(56) References Cited

U.S. PATENT DOCUMENTS

| 3,469,662 A * | 9/1969 | Dewar | G01P 15/165 |
| | | | 188/181 A |
| 2003/0083797 A1* | 5/2003 | Yokoyama | F16D 55/226 |
| | | | 303/20 |

(Continued)

OTHER PUBLICATIONS

Rapport De Recherche Preliminaire dated Mar. 12, 2020, for French Application No. 1906336, filed Jun. 13, 2019, 2 pages.

*Primary Examiner* — Robert A. Siconolfi
*Assistant Examiner* — San M Aung
(74) *Attorney, Agent, or Firm* — Christensen O'Connor Johnson Kindness PLLC (57) ABSTRACT

An aircraft wheel and brake assembly includes a wheel, a brake configured to brake the wheel, and a measurement device configured to measure the speed of rotation of the wheel. The brake includes at least one friction member, an actuator support, and at least one brake actuator carried by the actuator support and configured to exert a braking force selectively on the friction member. The measurement device includes a target and a sensing component for producing a measurement signal representative of the speed of rotation of the target. The aircraft wheel and brake assembly is configured in such a manner that, when assembled, the target is constrained to rotate with the wheel and the sensing component is mounted on the actuator support. The target and the sensing component is configured in such a manner that the sensing component detects rotation of the target.

16 Claims, 10 Drawing Sheets

(51) Int. Cl.
*G01P 3/36* (2006.01)
*G01P 3/46* (2006.01)

(58) Field of Classification Search
CPC ........ B60T 2240/00; G01P 1/026; G01P 3/36; G01P 3/46; G01P 3/488; G01P 3/4805; G01P 15/165; G01P 3/44; F16D 55/226; F16D 65/18; F16D 66/00; F16D 66/02; F16D 2121/24; F16D 2125/40; F16D 2066/001; F16D 2066/003; F16D 2066/005; F16D 2066/006; B64F 5/60; B64C 25/34; B64C 25/42; B64C 25/02; G01D 5/12
USPC .......................................................... 301/6.2
See application file for complete search history.

(56) References Cited

U.S. PATENT DOCUMENTS

| | | | | |
|---|---|---|---|---|
| 2004/0164608 | A1* | 8/2004 | Ohtsuki | B60T 13/741 |
| | | | | 303/167 |
| 2004/0261512 | A1* | 12/2004 | Daly | B60C 23/0494 |
| | | | | 73/146 |
| 2008/0202865 | A1* | 8/2008 | Pradier | F16D 55/36 |
| | | | | 188/1.11 W |
| 2009/0278401 | A1* | 11/2009 | Summers | B60T 13/741 |
| | | | | 303/20 |
| 2012/0138742 | A1* | 6/2012 | Farid | B64C 25/44 |
| | | | | 318/400.3 |
| 2016/0091522 | A1* | 3/2016 | Zabulon | G01P 3/44 |
| | | | | 73/115.08 |
| 2018/0154873 | A1* | 6/2018 | Masuda | F16D 66/00 |
| 2019/0136928 | A1* | 5/2019 | Prouzet | F16D 66/028 |

* cited by examiner

AIRCRAFT WHEEL AND BRAKE ASSEMBLY

CROSS REFERENCE TO RELATED APPLICATION

This application claims priority under 35 U.S.C. § 119 to French Patent Application No. 1906336, filed Jun. 13, 2019, which is herein incorporated by reference in its entirety.

FIELD

Embodiments of the present disclosure relate to the field of measuring the speed of rotation of a braked wheel, e.g., of an aircraft.

BACKGROUND

A brake system for the wheels of an aircraft comprises a plurality of brakes, each fitted to a so-called "braked" wheel of the aircraft. Conventionally, the brake system implements an anti-skid function for the braked wheels.

Measuring the speeds of rotation of braked wheels while the aircraft is on the ground constitutes a key element of the anti-skid function.

In addition to its brake, each braked wheel is fitted with a device for measuring its instantaneous speed of rotation in order to detect when locking is starting: this device is a "tachometer."

Conventionally, an aircraft wheel tachometer makes use of passive magnetic technology, such as variable reluctance, for example. The tachometer generates an electrical measurement signal at a frequency that is the frequency of rotation of the wheel or a multiple of the frequency of rotation of the wheel.

The tachometer is installed in the vicinity of the axis of rotation of the wheel, generally in the axle or in the wheel cover. A target that is constrained to rotate with the wheel, and a sensing component (or sensor cell) of the tachometer identifies either the angular position of the target or else a variation in its angular position.

Figure 1:
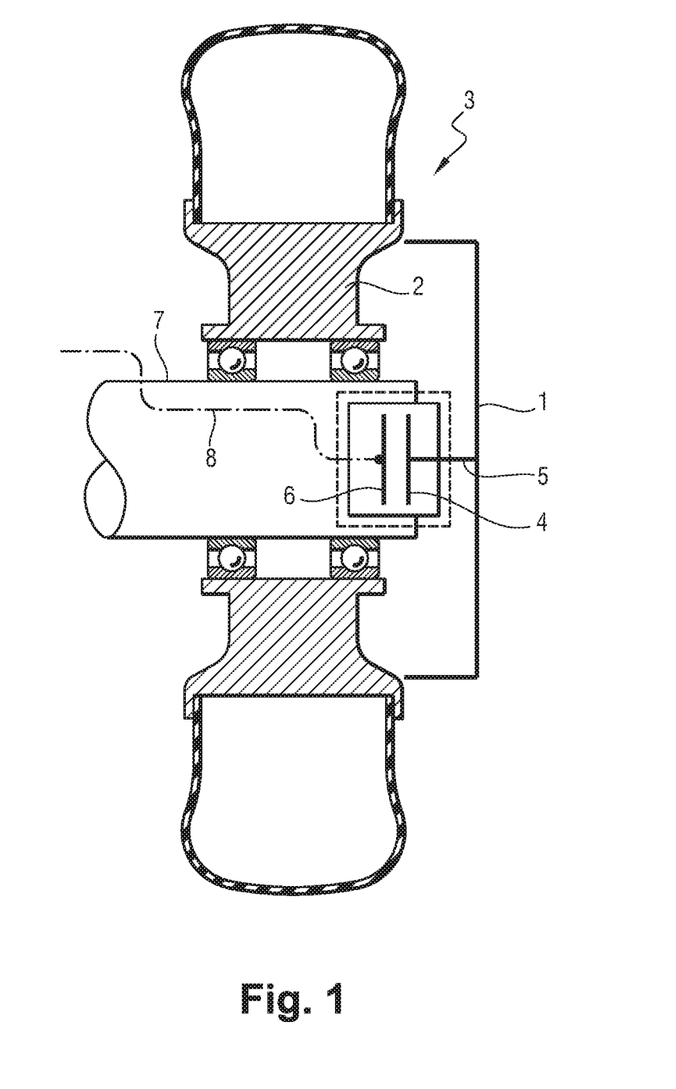
FIG. 1 shows a wheel and a first tachometer in section view on a plane containing the axis of rotation of the wheel.

Thus, with reference to FIG. 1, a first solution uses a wheel cover 1 fastened to the rim 2 of the wheel 3 and rotating with the wheel 3 in order to drive a target 4 by means of a driver device 5. The angular position or the speed of rotation of the wheel 3 is acquired by the sensing component 6 that is stationary and that is positioned inside the axle 7 in the proximity of the target 4. The sensing component 6 is connected by a cable 8 to the brake system, to which it transmits the analog or digital electrical measurement signal.

Figure 2:
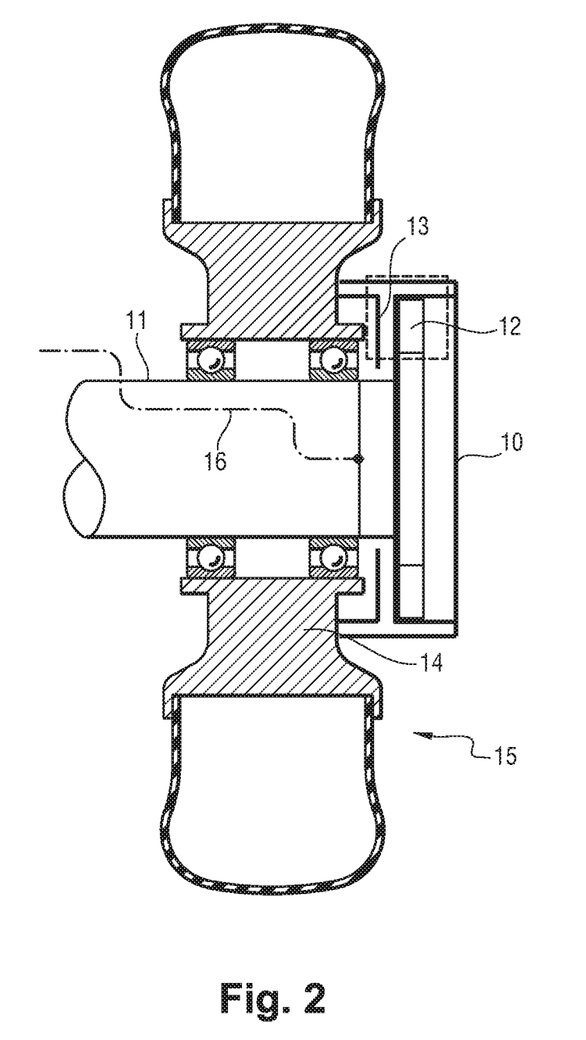
FIG. 2 shows a wheel and a second tachometer in section view on a plane containing the axis of rotation of the wheel.

With reference to FIG. 2, a second solution uses a wheel cover 10, which this time is secured to the axle 11 and is thus stationary, and to incorporate the sensing component 12 in the wheel cover 10. The target 13 is secured to the rim 14 of the wheel 15 and it is positioned between the rim 14 and the sensing component 12. The sensing component 12 is connected to the brake system by means of a cable 16.

Those solutions are relatively robust and effective, but they nevertheless present certain drawbacks.

The sensitivity of variable reluctance tachometers at low speed is relatively poor because the electrical measurement signals produced by such variable reluctance tachometers are too small to be reliable.

Proposals have thus been made to use active sensors, e.g., Hall effect sensors. At low speed, their sensitivity is better than the sensitivity of variable reluctance tachometers.

Nevertheless, the environment at the end of the axle is subjected to large temperature fluctuations associated with the temperature of the brake rising on landing, and with the temperature dropping in flight.

Unfortunately, Hall effect sensors are more sensitive to the environment than are passive magnetic sensors. In particular, their transfer function is modified by temperature and presents considerable variability on manufacture, such that using that technology makes it necessary to take steps in order to compensate those factors. The principle of Hall effect measurement can also require the presence of magnets that have characteristics that are accurate and stable over time. All this involves the measurement function being associated with temperature compensation and calibration functions, thereby complicating the use of that type of technology.

Proposals have also been made to use solutions derived from other industrial fields. In industry, the speed of rotation of a rotating element is generally measured by means of a coder delivering its angular position on a digital bus (referred to as an "absolute coder"), or else generating pulses at regular intervals (referred to as an "incremental coder"). Such coders make use of optical technology, or else of magnetic technology, generally involving the Hall effect.

The above-mentioned large temperature fluctuations give rise to material expansion and contraction cycles that degrade the effectiveness of sealing gaskets and that, over time, degrade the performance of sensors that require good sealing, such as optical sensors.

Among the drawbacks of known solutions, it should also be observed that present tachometers need to be removed when dismounting a wheel, and reinstalled when re-mounting the wheel. Unfortunately, since wheels are dismounted and re-mounted quite frequently, and since highly-accurate tachometers are relatively fragile, the risk of damage due to handling when dismounting and re-mounting wheels is indeed real and considerable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure are intended to improve the accuracy of an aircraft wheel tachometer and to increase its lifetime.

In an aspect, the present disclosure provides an aircraft wheel and brake assembly comprising a wheel, a brake configured to brake the wheel, and a measurement device configured to measure the speed of rotation of the wheel, the brake comprising at least one friction member, an actuator support, and at least one brake actuator carried by the actuator support and configured to exert a braking force selectively on the friction member, the measurement device comprising a target and a sensing component configured to produce a measurement signal representative of the speed of rotation of the target, the aircraft wheel and brake assembly being configured in such a manner that, when the aircraft wheel and brake assembly is assembled, the target is constrained to rotate with the wheel and the sensing component is mounted on the actuator support, the target and the sensing component being configured in such a manner that the sensing component detects rotation of the target.

Thus, in the aircraft wheel and brake assembly of embodiments of the present disclosure, the sensing component is mounted on the actuator support and is no longer located inside the axle of the cover. Advantageously, it is therefore subjected to temperature cycles that are less constraining, thereby increasing its lifetime. This configuration is compatible with using active sensors, which present better sensitivity than passive sensors and in particular than variable reluctance sensors. Since the sensing component is on the actuator support beside the brake, there is no longer any need to manipulate it when dismounting and re-mounting the wheel. Advantageously, this serves to increase the lifetime of the sensing component, since it is subjected to significantly less risk of damage associated with dismounting and re-mounting the wheel.

In another aspect, the present disclosure provides an aircraft wheel and brake assembly as described above, wherein the target is mounted on a rim of the wheel and is positioned, along the axis of rotation of the wheel, between the actuator support and the wheel.

In another aspect, the present disclosure provides an aircraft wheel and brake assembly as described above, wherein the brake actuator is positioned, along a first radial direction perpendicular to the axis of rotation of the wheel, between the sensing component and the axis of rotation of the wheel.

In another aspect, the present disclosure provides an aircraft wheel and brake assembly as described above, wherein the sensing component is positioned, along a first radial direction perpendicular to the axis of rotation of the wheel, between the brake actuator and the axis of rotation of the wheel.

In another aspect, the present disclosure provides an aircraft wheel and brake assembly as described above, wherein the sensing component and the target extend in succession along an axial direction parallel to the axis of rotation of the wheel.

In another aspect, the present disclosure provides an aircraft wheel and brake assembly as described above, wherein the sensing component and the target extend in succession along a second radial direction perpendicular to the axis of rotation of the wheel.

In another aspect, the present disclosure provides an aircraft wheel and brake assembly as described above, wherein the target is a toothed wheel having axial teeth.

In another aspect, the present disclosure provides an aircraft wheel and brake assembly as described above, wherein the target is a toothed wheel having radial teeth.

In another aspect, the present disclosure provides an aircraft wheel and brake assembly as described above, wherein the target comprises a plurality of rows of teeth.

In another aspect, the present disclosure provides an aircraft wheel and brake assembly as described above, wherein the target includes a reference tooth comprising an extra thickness such that the measurement signal presents a particular shape when the sensing component detects the reference tooth.

In another aspect, the present disclosure provides an aircraft wheel and brake assembly as described above, including two sensing components that are offset by one-half of a period of a pattern of the target.

In another aspect, the present disclosure provides an aircraft wheel and brake assembly as described above, including two sensing components that are offset modulo an odd number of fourths of a period of a pattern of the target.

In another aspect, the present disclosure provides an aircraft wheel and brake assembly as described above, wherein the sensing component is a magnetic sensor.

In another aspect, the present disclosure provides an aircraft wheel and brake assembly as described above, wherein the sensing component is an optical sensor.

In another aspect, the present disclosure provides an aircraft wheel and brake assembly as described above, wherein the sensing component is an ultrasound sensor.

In another aspect, the present disclosure provides an aircraft undercarriage including an aircraft wheel and brake assembly as described above.

In another aspect, the present disclosure provides an aircraft including an aircraft undercarriage as described above.

The embodiments of the present disclosure can be better understood in the light of the following description of representative, nonlimiting embodiments.

DESCRIPTION OF THE DRAWINGS

The foregoing aspects and many of the attendant advantages of embodiments of the present disclosure will become more readily appreciated as the same become better understood by reference to the following detailed description, when taken in conjunction with the accompanying drawings, wherein.

DETAILED DESCRIPTION

Figure 3:
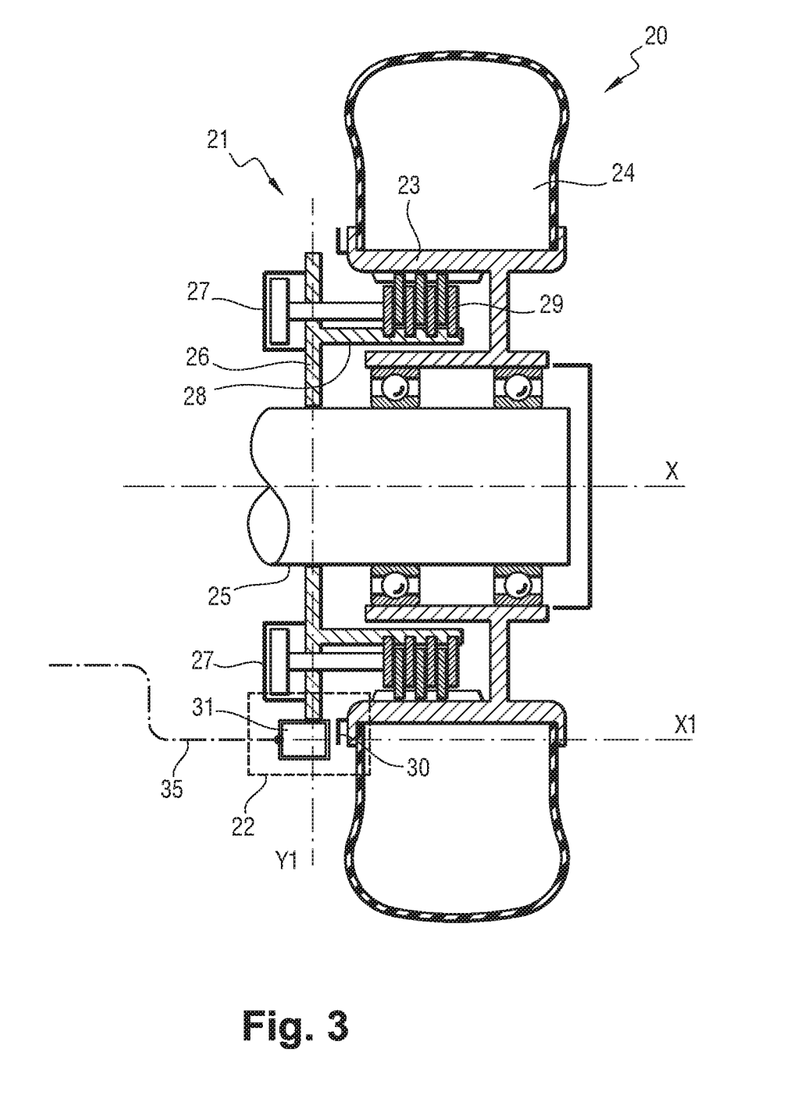
FIG. 3 shows an aircraft wheel and brake assembly in a first representative embodiment of the present disclosure, in a section view on a plane containing the axis of rotation of the wheel.

With reference to FIG. 3, an aircraft wheel and brake assembly in a first representative and non-limiting embodiment of the present disclosure comprises an aircraft landing-gear wheel 20, a brake 21, and a measurement device 22 for measuring the speed of rotation of the wheel 20.

The aircraft wheel and brake assembly in the first embodiment of the present disclosure is described in its assembled configuration.

The wheel 20 comprises a rim 23 that receives a tire 24 and that is rotatably mounted on an axle 25 located at the bottom of the landing gear.

The brake 21 is configured for braking the wheel 20. In this example, the brake 21 is a hydraulic brake. The brake 21 comprises an actuator support, specifically a ring 26, that carries at least one brake actuator, specifically a plurality of brake actuators 27. The ring 26 is mounted on the axle 25.

A torsion tube 28 is secured to the ring 26. The torsion tube 28 extends inside the rim 23. The ring 26, and thus also the torsion tube 28, are prevented from rotating relative to the axle 25 by stop means.

The brake 21 also comprises at least one friction member. e.g., a stack of carbon disks 29 made up of rotors that are constrained to rotate with the rim 23, and of stators that are constrained to rotate with the torsion tube 28.

The brake actuators 27 are configured to exert a braking force on the carbon disks selectively on admission of fluid under pressure.

The measurement device 22 comprises a target 30 and a sensing component 31 configured for producing an electrical measurement signal that is representative of the speed of rotation of the target 30.

In this example, the target 30 is a metal toothed wheel that is mounted on the rim 23 of the wheel 20. The term "mounted" is used to mean that the target 30 is fastened to the rim 23 directly, or else is fastened to a support that is itself fastened to the rim 23.

Along an axis of rotation X of the wheel 20, the target 30 is positioned between the ring 26 and the wheel 20.

As for the sensing component 31, it is mounted on the ring 26. Once again, the term "mounted" is used to mean that the sensing component 31 is fastened to the ring 26 directly or else is fastened to a support that is itself fastened to the ring 26.

The sensing component 31 extends from a face of the ring 26 that faces an inside face of the wheel 20, said inside face of the wheel 20 being the face of the wheel 20 beside which the brake 21 is located.

It can be seen that the brake actuator 27 that is close or adjacent to the sensing component 31 is itself positioned, along a first radial direction Y1 perpendicular to the axis of rotation X of the wheel 20, between the sensing component 31 and the axis of rotation X of the wheel 20. In other words, the sensing component 31 is situated at an outside portion of the ring 26, close to its periphery or on the periphery of the ring 26.

It should be observed that it is possible for the sensing component 31 to be positioned, along the first radial direction Y1 perpendicular to the axis of rotation X of the wheel 20, between the brake actuator 27 and the axis of rotation X of the wheel 20. In other words, in some embodiments, the sensing component 31 is situated at a central inside portion of the ring 26, close to its center.

In this example, the measurement device 22 is configured with an axial configuration: the sensing component 31 and the target 30 extend in succession along an axial direction X1 parallel to the axis of rotation X of the wheel 20.

Figure 4:
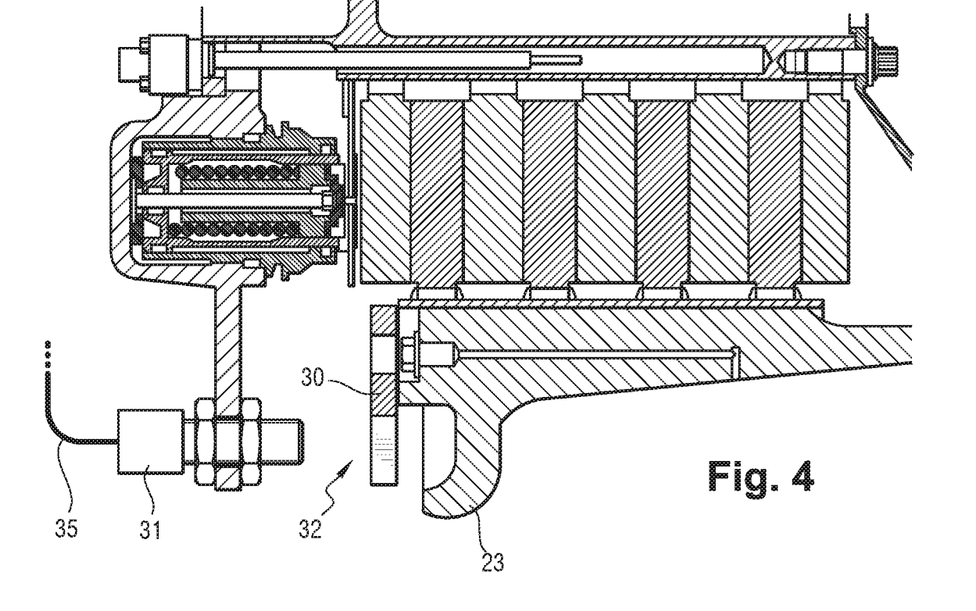
FIG. 4 is a view similar to FIG. 3 but in greater detail, a target of the measurement device being a target with radial teeth.
Figure 5:
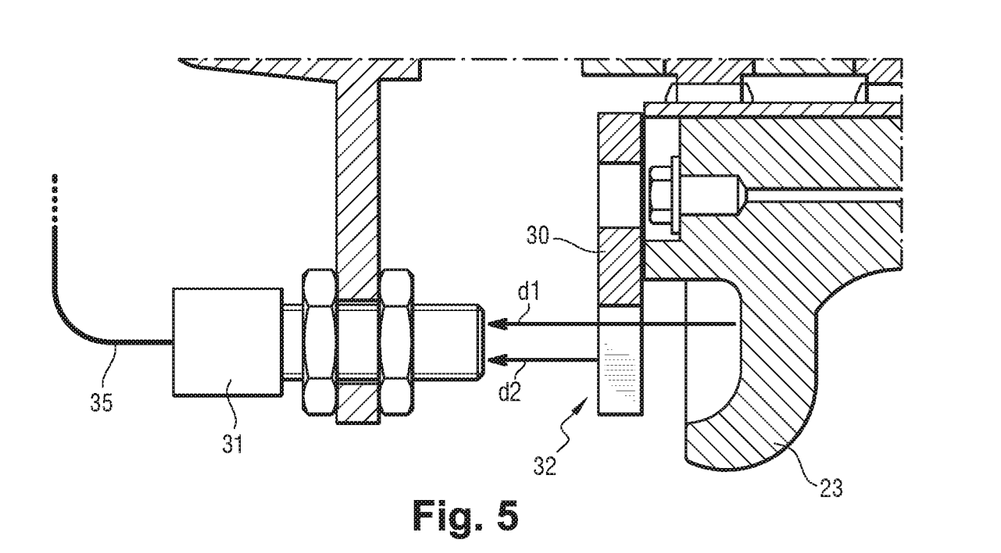
FIG. 5 is a detail view of FIG. 4.

With reference to FIGS. 4 and 5, it can be seen that the target 30 may be a target with radial teeth: the teeth 32 extend from a central main portion of the target in directions that are radial, i.e., perpendicular to the axis of rotation X of the wheel 20.

Figure 6:
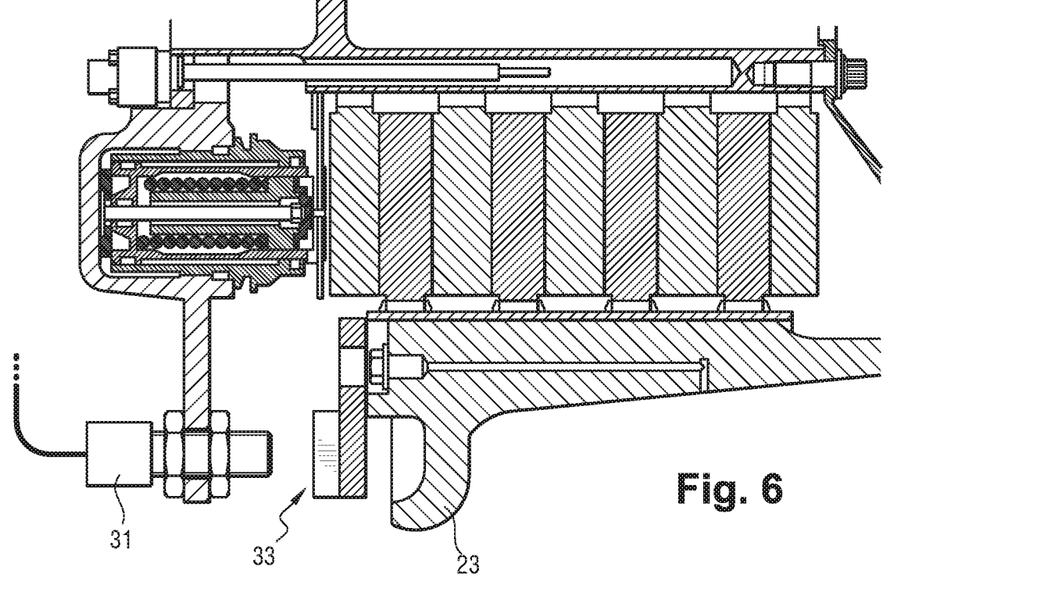
FIG. 6 is a view similar to FIG. 3 but in greater detail, a target of the measurement device being a target with axial teeth.

With reference to FIG. 6, it can be seen that the target 30 may be a target having axial teeth: the teeth 33 extend from a plane main portion of the target along directions that are axial, i.e., parallel to the axis of rotation X of the wheel 20.

In this example, the sensing component 31 is a magnetic sensor, specifically a Hall effect sensor. In this example, the distance between the Hall effect sensor 31 and the target 30 lies in the range 1 millimeter (mm) to 7 mm.

The Hall effect sensor 31 is connected to a processor unit (e.g., a computer having a processor and memory programmed with logic) that may be situated in the fuselage of the aircraft, on the landing gear, in the axle 25, or external to the aircraft (e.g., on a remote server). In this example, the connection is a wired connection passing via the cable 35, however it could be a wireless connection. The processor unit could also be referred to as a computer, a controller, a data concentrator, etc.

When a gap is facing the Hall effect sensor 31, the distance between the Hall effect sensor 31 and the nearest mass of metal is equal to d1 (see FIG. 5). When a tooth 32 (or 33) is facing the Hall effect sensor 31, the distance between the Hall effect sensor 31 and the nearest mass of metal is equal to d2.

The Hall effect sensor 31 thus produces an electrical measurement signal, specifically an analog signal, of amplitude that depends on the presence of a tooth 32 or of a gap facing the Hall effect sensor 31. The Hall effect sensor 31 thus detects rotation of the target 30.

The electrical measurement signal has a frequency that is proportional to the speed of rotation of the target 30, and thus to the speed of rotation of the wheel 20. The processor unit acquires the electrical measurement signal, and on the basis of electrical measurement signal it produces an estimate of the speed of rotation of the target 30, and thus of the speed of rotation of the wheel 20.

Figure 7:
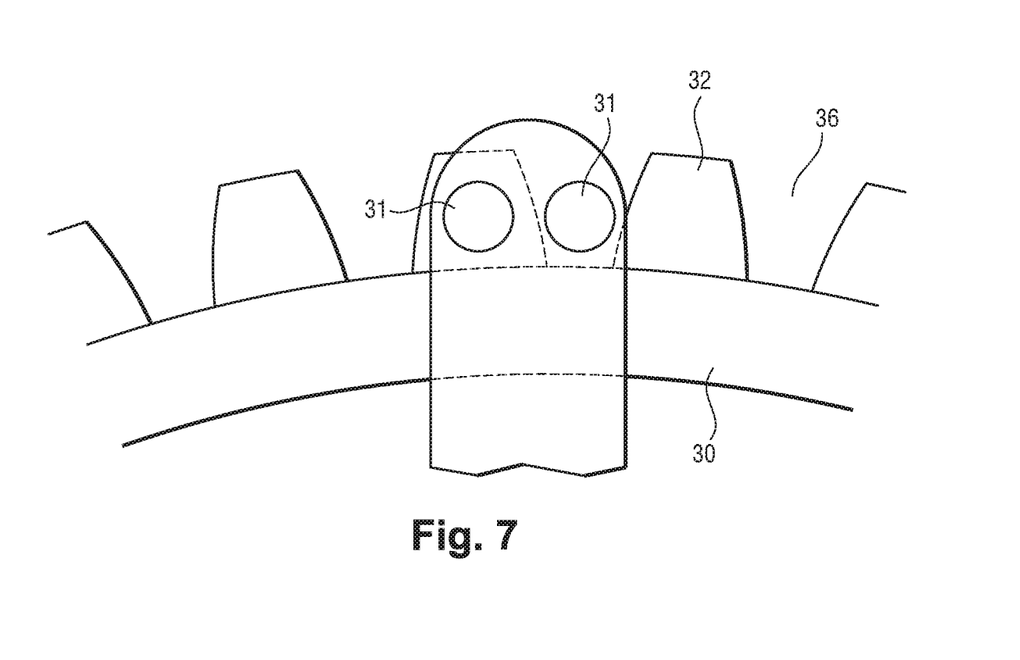
FIG. 7 shows the target and two sensing components.

Advantageously, and with reference to FIG. 7, use is made of a plurality of Hall effect sensors 31 rather than one.

Advantageously, the measurement device 22 is robust in the presence of mechanical slack and of vibration affecting the measurement of distance, and thus affecting the amplitude of the electrical measurement signal. In a frequency measuring system, as in this example, variations in amplitude can be accommodated, but it is preferable to reduce them in order to avoid measurement errors. Using a plurality of Hall effect sensors 31 makes it possible to eliminate those interfering magnitudes that affect the Hall effect sensors 31 in the same manner, such as temperature, deformation of the wheel, or vibration to which the wheel is subjected.

In some embodiments, a plurality of Hall effect sensors 31 are used (e.g., two).

In this representative example, the Hall effect sensors 31 are offset by one-half of a period of the pattern of the target 30. One period of the pattern corresponds to one tooth 32 followed by one gap 36 (or vice versa).

The two electrical measurement signals produced by the two Hall effect sensors 31 represent the same response associated with the shape of the target 30, with an offset of one-half of a period. The two electrical measurement signals are thus in phase opposition.

The difference is then taken between the two electrical measurement signals (by calculation or by means of a digital or analog circuit). The amplitudes of the two electrical measurement signals, which are in phase opposition, therefore add. Conversely, local interfering effects are eliminated or at least attenuated when taking the difference. Thus, by way of example, since vibration in the axial direction affects both Hall effect sensors 31 in the same manner, the effects of such vibration cancel when taking the difference and are therefore eliminated or almost eliminated.

The measurement device 22 can also serve to determine the direction of rotation of the wheel 20. This information can be useful for functions other than braking. These functions include, in particular, a function of engaging the electric taxiing system while the aircraft is taxiing. There is also an odometer function serving to estimate accurately the position of the aircraft on the ground.

The Hall effect sensors 31 are thus located in positions that serve both to take the difference as described above, and also to determine the direction of rotation of the wheel 20.

In this representative example and for this purpose, the two Hall effect sensors 31 are offset modulo an odd number of fourths of one period of the pattern of the target 30, e.g., ¼, ¾, or ⅝ of the period of the pattern. The offset that is selected depends in particular on the size of the teeth 32 and on the diameter of the Hall effect sensor 31.

Figure 8:
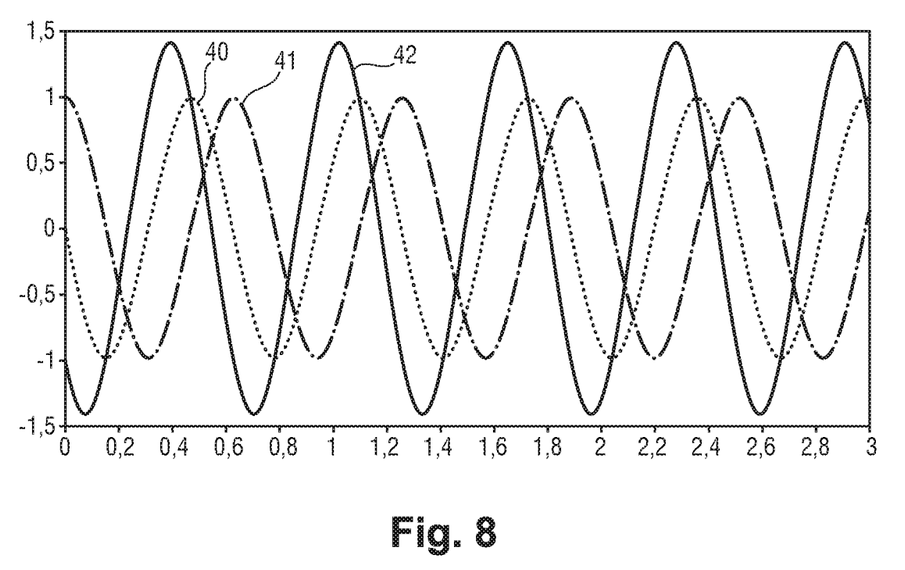
FIG. 8 is a graph plotting curves for electrical measurement signals obtained in a configuration in which the measurement device has two sensing components that are offset by one fourth of a period of a pattern of the target.

The curves shown in FIG. 8 correspond to a configuration in which the spacing between the two Hall effect sensors 31 is equal to one-fourth of a period of the pattern.

The curve 40 represents the electrical measurement signal produced by a first Hall effect sensor. The curve 41 represents the electrical measurement signal produced by a second Hall effect sensor. The curve 42 represents a resultant signal equal to the difference between the two electrical measurement signals.

It can be seen that the resultant signal presents a frequency that is a multiple of the frequency of rotation of the wheel 20. The resultant signal is cleared of local disturbances. The direction of rotation of the wheel 20 is determined by the sign of the phase delay of the electrical measurement signal produced by the second Hall effect sensor (curve 41) relative to the electrical measurement signal produced by the first Hall effect sensor (curve 40): $+\pi/2$ for rotation in a given direction, $-\pi/2$ for rotation in the opposite direction.

It is also possible to improve the measurement as follows.

It is known that the number of cycles per revolution of the wheel 20 is given by the number of teeth 32 of the target 30.

By way of example, increasing the number of cycles per revolution procures the advantage of improving the measurement at the slowest speeds while braking.

Specifically, the measurement time needed to take the measurement increases with increasing period of the pattern.

For example, if it is desired to measure a speed of rotation of 1 hertz (Hz) with a wheel having 100 teeth, the measurement time for one period is 1/100 Hz, i.e., 10 milliseconds (ms). It is possible to go down to 5 ms by measuring one half-period of the pattern. It is not possible to measure speed with a refresh rate better than 5 ms, without increasing the number of cycles per revolution, and thus the number of teeth. This number is limited by the diameter of the target (which for example is substantially equal to the diameter of the rim of the wheel), by the number of teeth that can be made with such a diameter, and by the angular resolution of a Hall effect sensor.

A target is thus used that has a plurality of toothed wheels, e.g., a plurality of rows of teeth, each row being associated with its own Hall effect sensor(s). This makes it possible to obtain a resultant signal at a frequency that is twice the number of teeth in each row (if two rows are used), thereby mitigating the above-described limitations associated with this technology.

Figure 9:
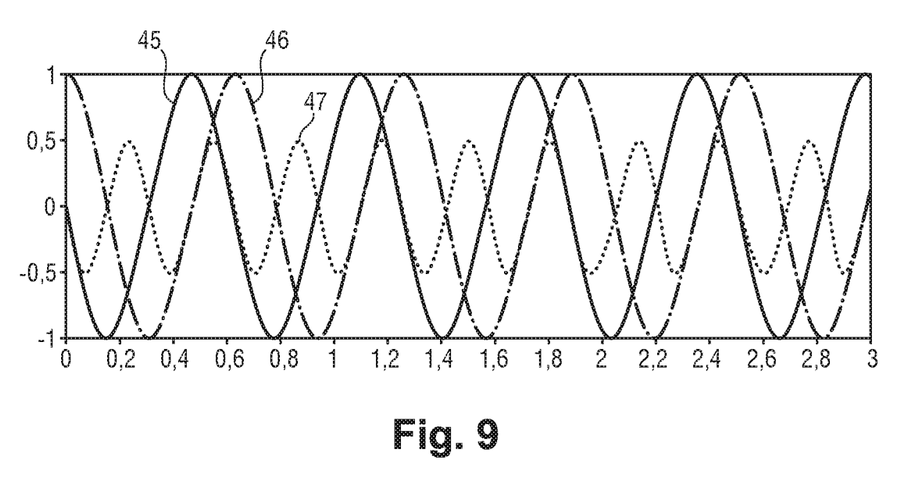
FIG. 9 is a graph similar to the graph of FIG. 8, in a configuration in which the target has two rows of teeth.

The curves shown in FIG. 9 correspond to a configuration in which two rows of teeth are used, the two rows of teeth being angularly offset by one-fourth of the period of the pattern, thereby once more enabling the direction of rotation of the wheel 20 to be determined.

The curve 45 represents the electrical measurement signal produced by the Hall effect sensor associated with a first row of teeth. The curve 46 represents the electrical measurement signal produced by the Hall effect sensor associated with a second row of teeth.

The curve 47 represents the resultant signal produced by combining the two electrical measurement signals. The number of cycles of the resultant signal is twice the number of cycles of the electrical measurement signals.

It can also be advantageous to determine the angular position of the wheel 20. By way of example, this information is useful, once more, for the function of engaging the electric taxiing system when the aircraft is taxiing at low speed. The speed of the taxiing motor, which drives rotation of the wheel 20, needs specifically to be synchronized with the speed of rotation of the wheel 20 so as to enable meshing that is smooth. Accurate knowledge of the position of the wheel 20, in addition to knowledge of the speed of rotation of the wheel 20, makes it possible to insert the teeth of the gear system in the teeth of the wheel drive device without risk of jolting them.

Determining the angular position of the wheel 20 can also serve in the odometer function.

The angular position of the wheel 20 can be obtained by adding a system that serves to obtain the position of the teeth 32 of the target 30 relative to an origin.

Figure 10:
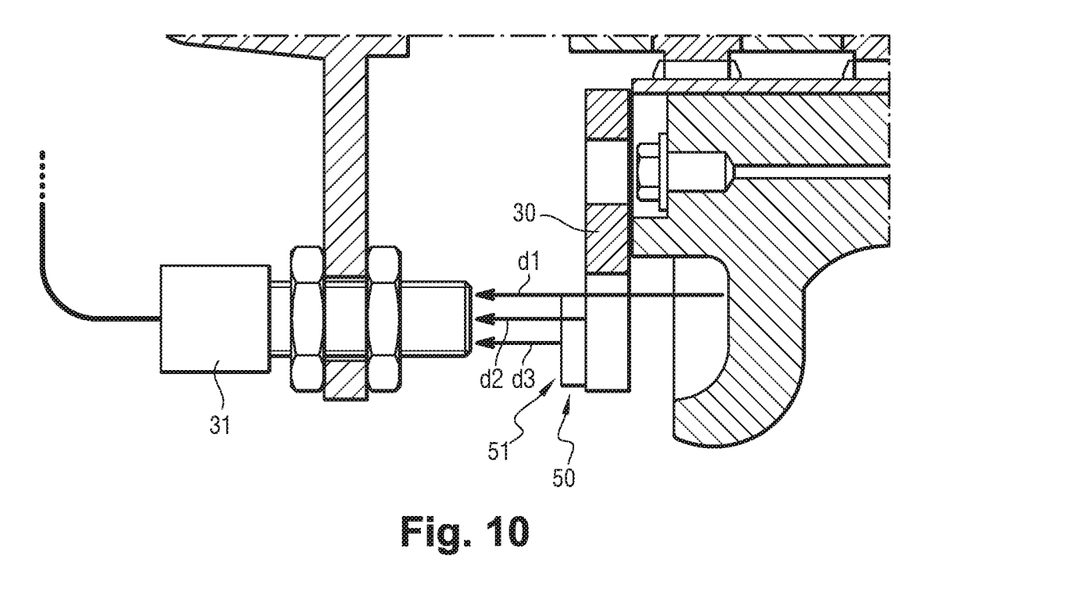
FIG. 10 shows a sensing component and a target having a reference tooth presenting greater thickness.

With reference to FIG. 10, an extra thickness 50 is added for this purpose to a reference tooth 51 of the target 30. This extra thickness 50 modifies the distance between the Hall effect sensor 31 and the target 30 when the reference tooth 51 is facing the Hall effect sensor 31, said distance then being equal to d3 (and not to d2). The extra thickness 50 affects the amplitude of the electrical measurement signal that is obtained specifically for this position of the target 30: the electrical measurement signal has a particular shape corresponding to the measurement component detecting the reference tooth 51. This serves to identify the origin of the angular position.

Figure 11:
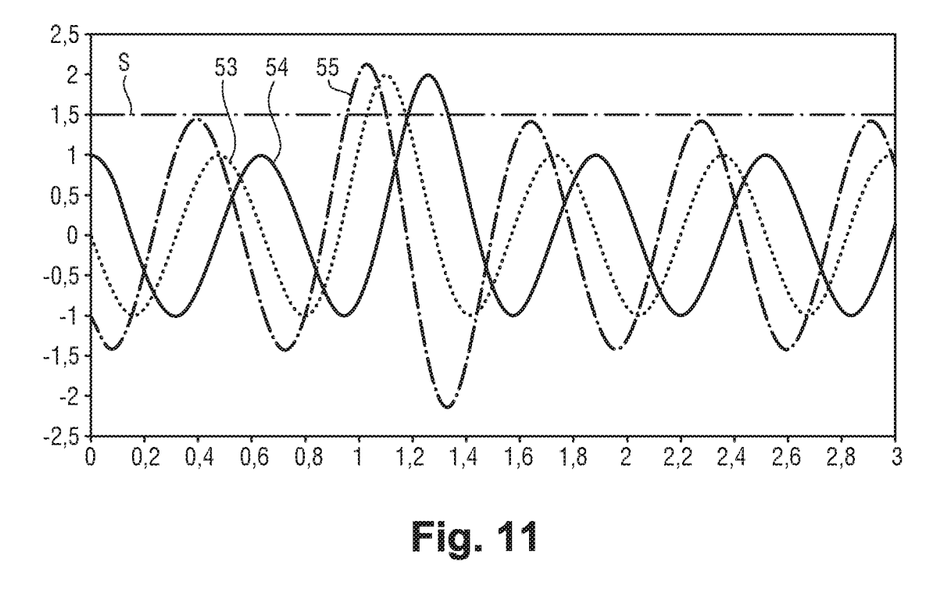
FIG. 11 is a graph plotting curves for electrical measurement signals obtained in the FIG. 10 configuration.

Thus, in FIG. 11, the curve 53 represents an electrical measurement signal produced by the first Hall effect sensor, the curve 54 represents an electrical measurement signal produced by the second Hall effect sensor 31, and the curve 55 represents a resultant signal equal to the difference between the two electrical measurement signals. The zero crossing, i.e., the reference tooth 51 passing in front of the Hall effect sensor, can be detected by thresholding: the amplitude of the resultant signal is compared with a predetermined threshold S, and it is considered that the zero crossing occurs when the amplitude of the resultant signal is greater than said predetermined threshold S.

The angular position of the target 30, and thus of the wheel 20, can then be obtained, e.g., by counting cycles from the zero crossing. The angular position is thus known to within 360°/N, where N is the number of teeth of the target 30.

It should be observed that a measurement device having three sensors, in which differences are taken between the electrical measurement signal produced by a central sensor and the electrical measurement signals produced by the neighboring sensors, makes it possible to determine an accurate angular position between two teeth.

It is also possible, in a system having multiple rows of teeth, to choose different profiles for the teeth of each of the rows of teeth. This makes it possible to improve angular position measurement, and in particular to obtain an absolute angular position for the wheel.

Figure 12:
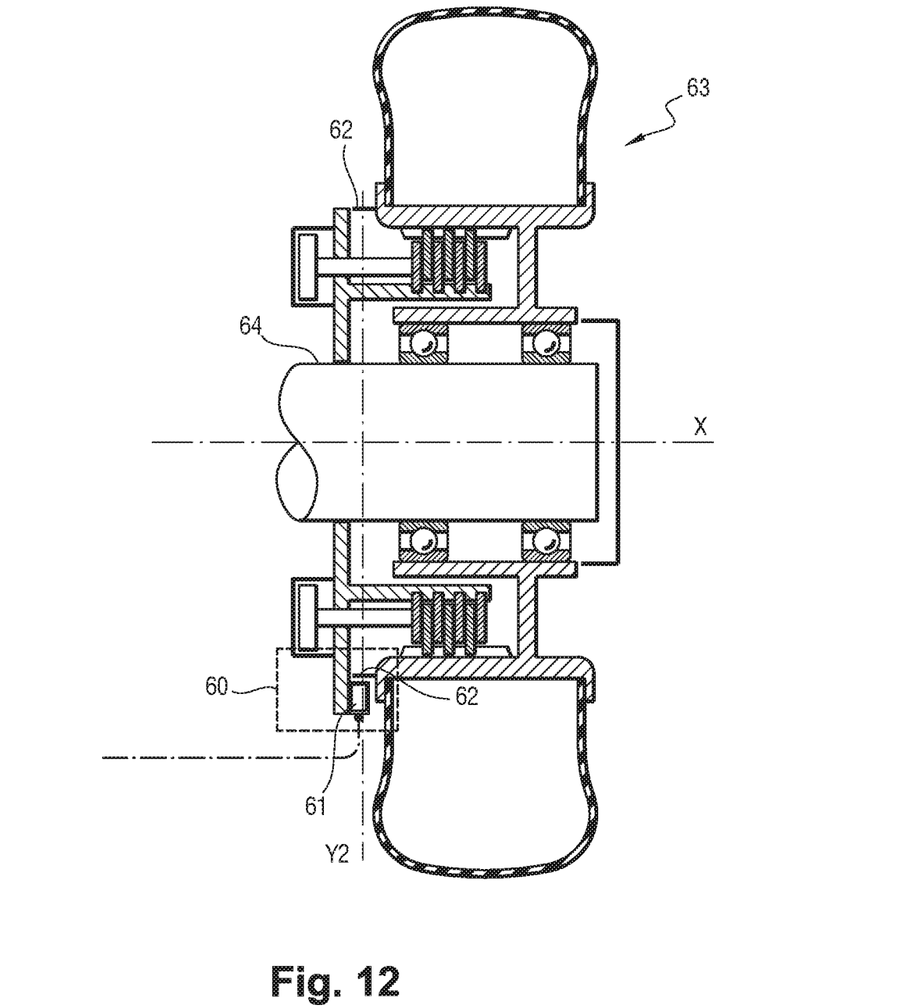
FIG. 12 shows an aircraft wheel and brake assembly in another representative embodiment of the present disclosure, in a section view on a plane containing the axis of rotation of the wheel.

With reference to FIG. 12, a measurement device 60 of an aircraft wheel and brake assembly in a second representative and non-limiting embodiment of the present disclosure may also be configured with a radial configuration: the Hall effect sensor 61 and the target 62 extend in succession along a second radial direction Y2 perpendicular to the axis of rotation X of the wheel 63.

In FIG. 12, it can be seen that the target 62 is positioned between the Hall effect sensor 61 and the axle 64. Naturally, the Hall effect sensor 61 could be positioned between the axle 64 and the target 62.

Figure 13:
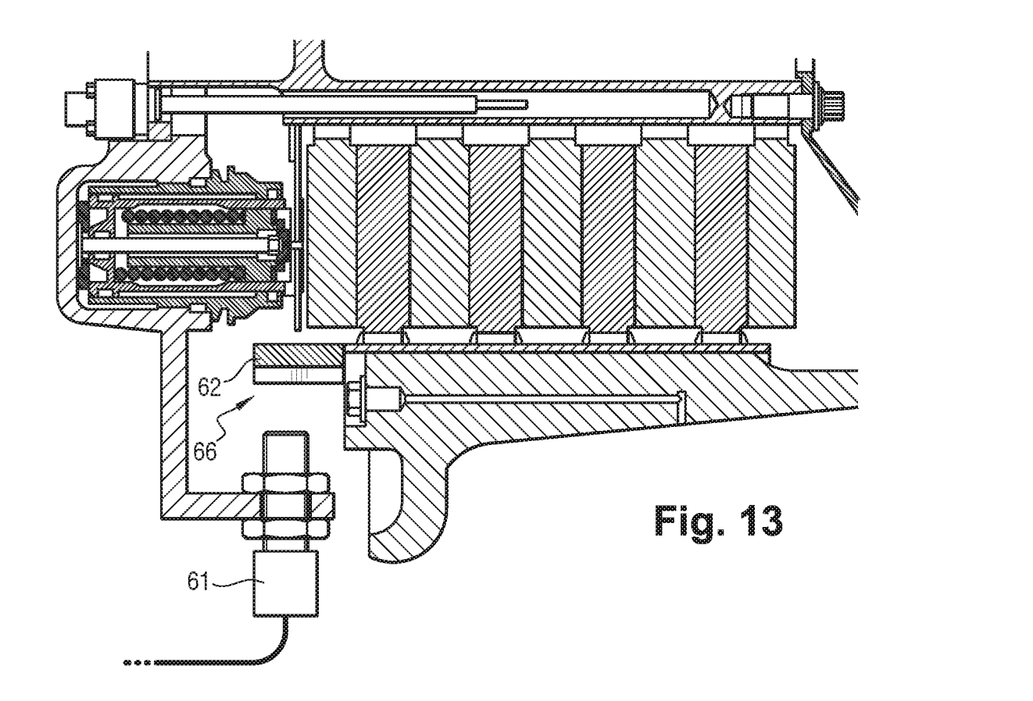
FIG. 13 is a view similar to FIG. 12 but in greater detail, a target of the measurement device being a target with radial teeth.
Figure 14:
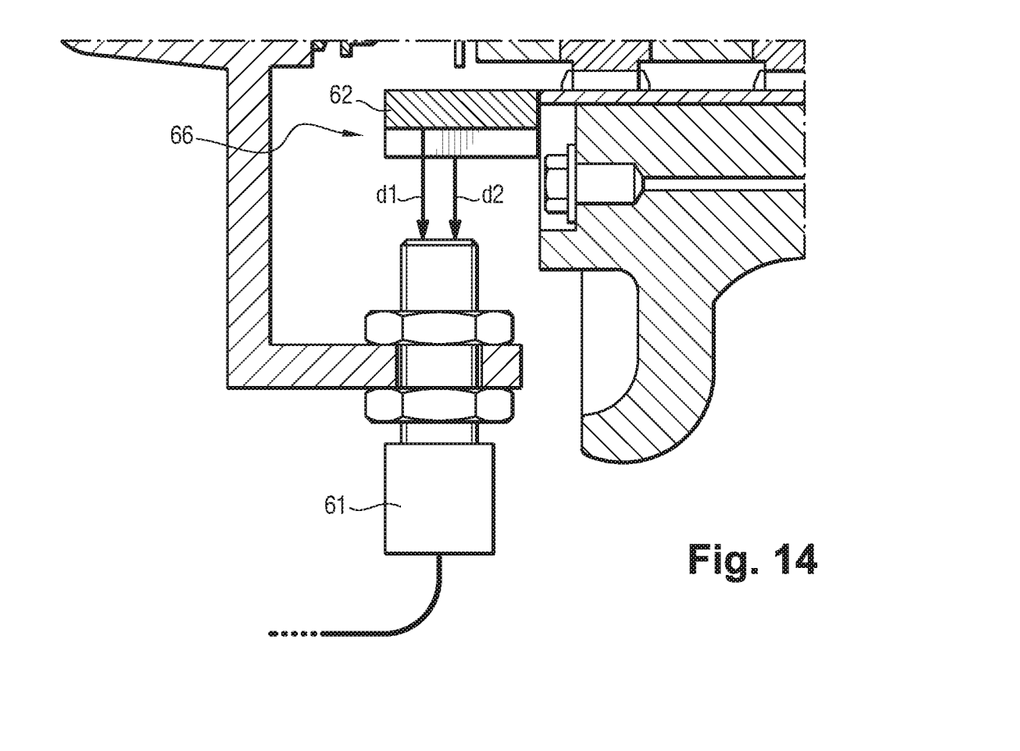
FIG. 14 is a detail view of FIG. 13.

With reference to FIGS. 13 and 14, it can be seen that the target 62 may be a target with radial teeth: the teeth 66 extend from a central main portion of the target 62 in directions that are radial, i.e., perpendicular to the axis of rotation of the wheel.

When a gap is facing the Hall effect sensor 61, the distance between the Hall effect sensor and the nearest mass of metal is equal to d1.

When a tooth 66 is facing the Hall effect sensor 61, the distance between the Hall effect sensor 61 and the nearest mass of metal is equal to d2.

Figure 15:
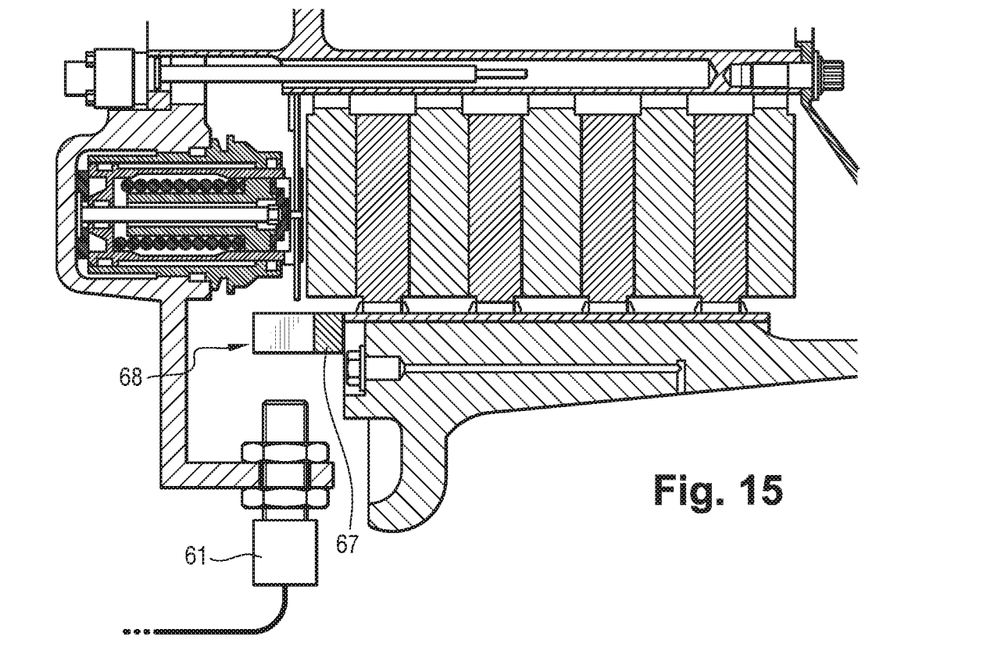
FIG. 15 is a view similar to FIG. 12 but in greater detail, a target of the measurement device being a target with axial teeth.

With reference to FIG. 15, it can be seen that the target 67 may be a target having axial teeth: the teeth 68 extend from a plane main portion of the target 67 along directions that are axial, i.e., parallel to the axis of rotation X of the wheel 63.

Once again, the electrical measurement signal produced by the Hall effect sensor 61 presents electrical alternation resulting from the alternation between the teeth and the gaps of the target.

Figure 16:
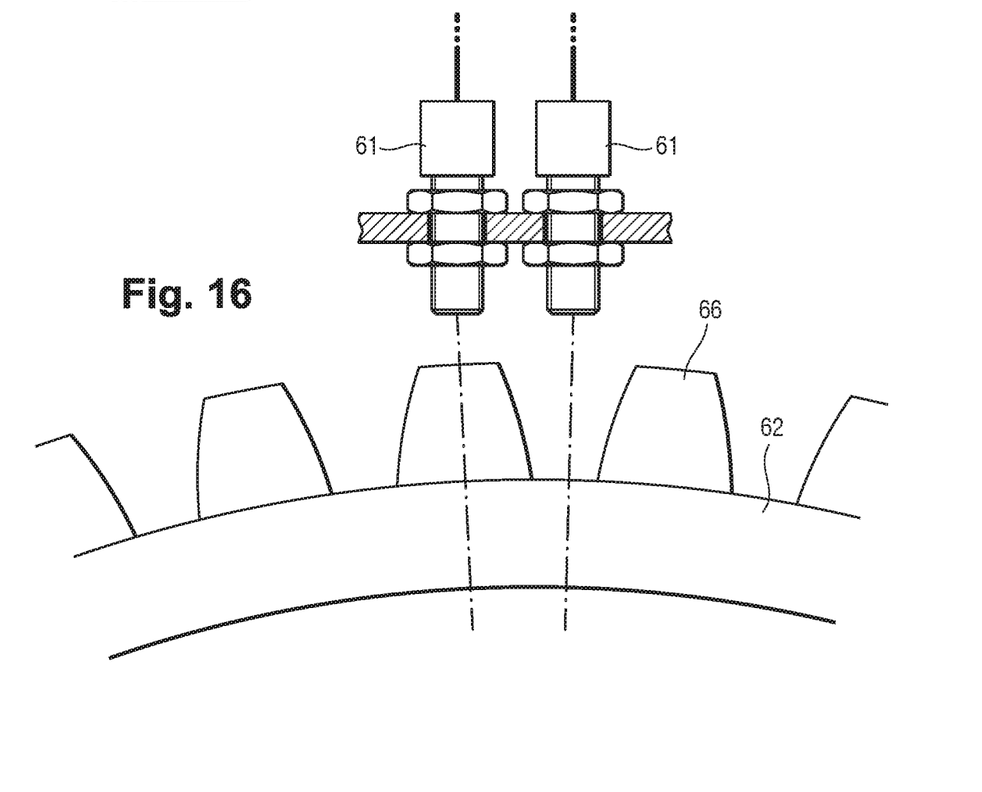
FIG. 16 shows the target and two sensing components.

Advantageously, once more, and with reference to FIG. 16, use is made of a plurality of Hall effect sensors 61, e.g., two of them, rather than one.

The difference is taken between two electrical measurement signals in order to improve the measurement and to eliminate local interference effects.

Naturally, the present disclosure is not limited to the embodiments described, but covers any variant coming within the ambit of the present disclosure as defined by the claims.

Above, the sensing component is described as being a Hall effect sensor, and the target as being a toothed wheel. This configuration does not limit the ambit of the present disclosure in any way.

Firstly it should be observed that, regardless of the technology used, the sensing component may be a distance sensor or a detector, for example.

A detector provides a measurement signal of the "on/off" type depending on whether the distance between the detector and the target is or is not greater than a predefined threshold.

A distance sensor provides a measurement signal that depends on the distance between the sensor and the target, as applies to a proximity sensor, for example.

The measurement technology could be inductive technology.

By way of example, the sensing component could then be an inductive proximity sensor. An inductive sensor would require a target made out of a metal material.

The measurement technology could be magnetic technology. By way of example, the sensor could be a Hall effect sensor, as described in this application. It could also be advantageous to replace the toothed wheel with a wheel having magnets.

Inductive and magnetic technologies may have a range that is greater than 10 mm, thus making it possible to have a measurement device that is compatible with the effects of the wheel deforming and vibrating while the aircraft is braking and/or while the aircraft is turning.

It is also possible to use an ultrasound technology. Ultrasound sensors and detectors are particularly effective for measuring distances of several centimeters. They also make it possible to take measurements on materials that are non-metallic, which makes it possible to use targets made out of composite materials, which are lighter in weight.

It is also possible to envisage using an optical technology. Optical sensors and detectors are likewise appropriate for measurement distances of centimeter order, and they present the advantage of enabling measurements to be taken using any target material that is sufficiently opaque.

Thus, in the first embodiment, i.e., when the measurement device is configured in an axial configuration (see FIGS. 3 to 6), the measurement distance may be as much as several centimeters, in particular in order to accommodate deformation or vibration of the wheel. Ultrasound measurement might then be the most appropriate.

Naturally, the brake of the wheel and brake assembly need not necessarily be a hydraulic brake, and it could be an electromechanical brake. The actuator support would then be an actuator carrier.

The target need not necessarily be mounted on the rim of the wheel, and by way of example it could be formed on or in the tire.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the FIGURES and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The embodiments of the invention in which an exclusive property or privilege is claimed are defined as follows:

1. An aircraft wheel and brake assembly, comprising:
    a wheel mounted to rotate around a rotation axis;
    a brake configured to brake the wheel, the brake comprising a friction member, an actuator support, and at least one brake actuator carried by the actuator support and configured to exert a braking force selectively on the friction member; and
    a measurement device configured to measure a speed of rotation of the wheel and comprising a target and a sensing component configured for producing a measurement signal representative of a speed of rotation of the target,
    wherein the aircraft wheel and brake assembly are configured such that, when the aircraft wheel and brake assembly is assembled, the target is constrained to rotate with the wheel and the sensing component is directly mounted on the actuator support, the target and the sensing component being configured such that the sensing component detects rotation of the target, the brake actuator extending between the rotation axis of the wheel and the sensing component when looking in a direction perpendicular to said axis of rotation.

2. The aircraft wheel and brake assembly according to claim 1, wherein the target is mounted on a rim of the wheel and is positioned, along an axis of rotation (X) of the wheel, between the actuator support and the wheel.

3. The aircraft wheel and brake assembly according to claim 1, wherein the brake actuator is positioned, along a first radial direction (Y1) perpendicular to an axis of rotation (X) of the wheel, between the sensing component and the axis of rotation (X) of the wheel.

4. The aircraft wheel and brake assembly according to claim 1, wherein the sensing component and the target extend in succession along an axial direction (X1) parallel to an axis of rotation (X) of the wheel.

5. The aircraft wheel and brake assembly according to claim 1, wherein the sensing component and the target extend in succession along a second radial direction (Y2) perpendicular to an axis of rotation (X) of the wheel.

6. The aircraft wheel and brake assembly according to claim 1, wherein the target is a toothed wheel having axial teeth.

7. The aircraft wheel and brake assembly according claim 1, wherein the target is a toothed wheel having radial teeth.

8. The aircraft wheel and brake assembly according to claim 6, wherein the target comprises a plurality of rows of teeth.

9. The aircraft wheel and brake assembly according to claim 6, wherein the target includes a reference tooth comprising an extra thickness such that the measurement signal presents a particular shape when the sensing component detects the reference tooth.

10. The aircraft wheel and brake assembly according to claim 1, wherein the sensing component is a first sensing component, the aircraft wheel and brake assembly further comprising a second sensing component offset from the first sensing component by one-half of a period of a pattern of the target.

11. The aircraft wheel and brake assembly according to claim 1, wherein the sensing component is a first sensing component, the aircraft wheel and brake assembly further comprising a second sensing component, wherein the first sensing component and the second sensing component are offset modulo an odd number of fourths of a period of a pattern of the target.

12. The aircraft wheel and brake assembly according to claim 1, wherein the sensing component is a magnetic sensor.

13. The aircraft wheel and brake assembly according to claim 1, wherein the sensing component is an optical sensor.

14. The aircraft wheel and brake assembly according to claim 1, wherein the sensing component is an ultrasound sensor.

15. An aircraft undercarriage including an aircraft wheel and brake assembly according to claim 1.

16. An aircraft including an aircraft undercarriage according to claim 15.

* * * * *